United States Patent
Azizgolshani

(10) Patent No.: US 9,501,921 B2
(45) Date of Patent: Nov. 22, 2016

(54) WATER SAVING ALERT SYSTEM

(71) Applicant: Moein Azizgolshani, Beverly Hills, CA (US)

(72) Inventor: Moein Azizgolshani, Beverly Hills, CA (US)

(73) Assignee: Moein Azizgolshani, Beverly Hills, CA (US)

( * ) Notice: Subject to any disclaimer, the term of this patent is extended or adjusted under 35 U.S.C. 154(b) by 0 days.

(21) Appl. No.: 14/696,231

(22) Filed: Apr. 24, 2015

(65) Prior Publication Data
US 2015/0317895 A1    Nov. 5, 2015

Related U.S. Application Data

(60) Provisional application No. 61/986,818, filed on Apr. 30, 2014.

(51) Int. Cl.
| | | |
|---|---|---|
| *G08B 21/00* | (2006.01) | |
| *G08B 23/00* | (2006.01) | |
| *G08B 21/18* | (2006.01) | |
| *G08B 5/36* | (2006.01) | |
| *A47K 3/00* | (2006.01) | |
| *E03B 7/07* | (2006.01) | |
| *G08B 3/10* | (2006.01) | |
| *G08B 21/24* | (2006.01) | |

(52) U.S. Cl.
CPC ............. *G08B 23/00* (2013.01); *A47K 3/001* (2013.01); *E03B 7/071* (2013.01); *G08B 5/36* (2013.01); *G08B 21/182* (2013.01); *G08B 3/10* (2013.01); *G08B 21/24* (2013.01)

(58) Field of Classification Search
CPC ..... G08B 21/20; G08B 21/182; G08B 21/18
USPC .................................................. 340/603–611
See application file for complete search history.

(56) References Cited

U.S. PATENT DOCUMENTS

| | | | | |
|---|---|---|---|---|
| 3,680,336 A * | 8/1972 | Schendel | ............ | E05B 47/0043 70/276 |
| 5,992,218 A * | 11/1999 | Tryba | ...................... | G01M 3/16 137/312 |
| 2005/0275547 A1 * | 12/2005 | Kates | ..................... | G08B 19/00 340/605 |
| 2006/0042694 A1 * | 3/2006 | Reineck | .................. | F16K 35/10 137/377 |
| 2011/0025511 A1 * | 2/2011 | Wien | ........................ | F17D 5/06 340/605 |
| 2011/0303311 A1 * | 12/2011 | Klicpera | ............... | B05B 12/008 137/551 |
| 2014/0306828 A1 * | 10/2014 | Trescott | .................. | E03B 7/003 340/605 |
| 2014/0320291 A1 * | 10/2014 | De Luca | ................ | G08B 21/20 340/573.1 |
| 2015/0027565 A1 * | 1/2015 | Vatanakorn | ............. | E03D 11/00 137/487.5 |

* cited by examiner

*Primary Examiner* — Kerri McNally
*Assistant Examiner* — Sharmin Akhter

(57) ABSTRACT

The present invention generally relates to a device that will alert users that they are using (or wasting) more than a certain amount of water. More particularly, the present invention relates to a portable device clip that may be connected to any type of water pipe, will measure and time the flow of water, and will alert users via an audible alarm if and when water flows for more than a user-specified period of time. The invention may be used by both consumers and landlords to educate users in the prevention of undue water consumption, and to save thousands of gallons of water per year.

10 Claims, 1 Drawing Sheet

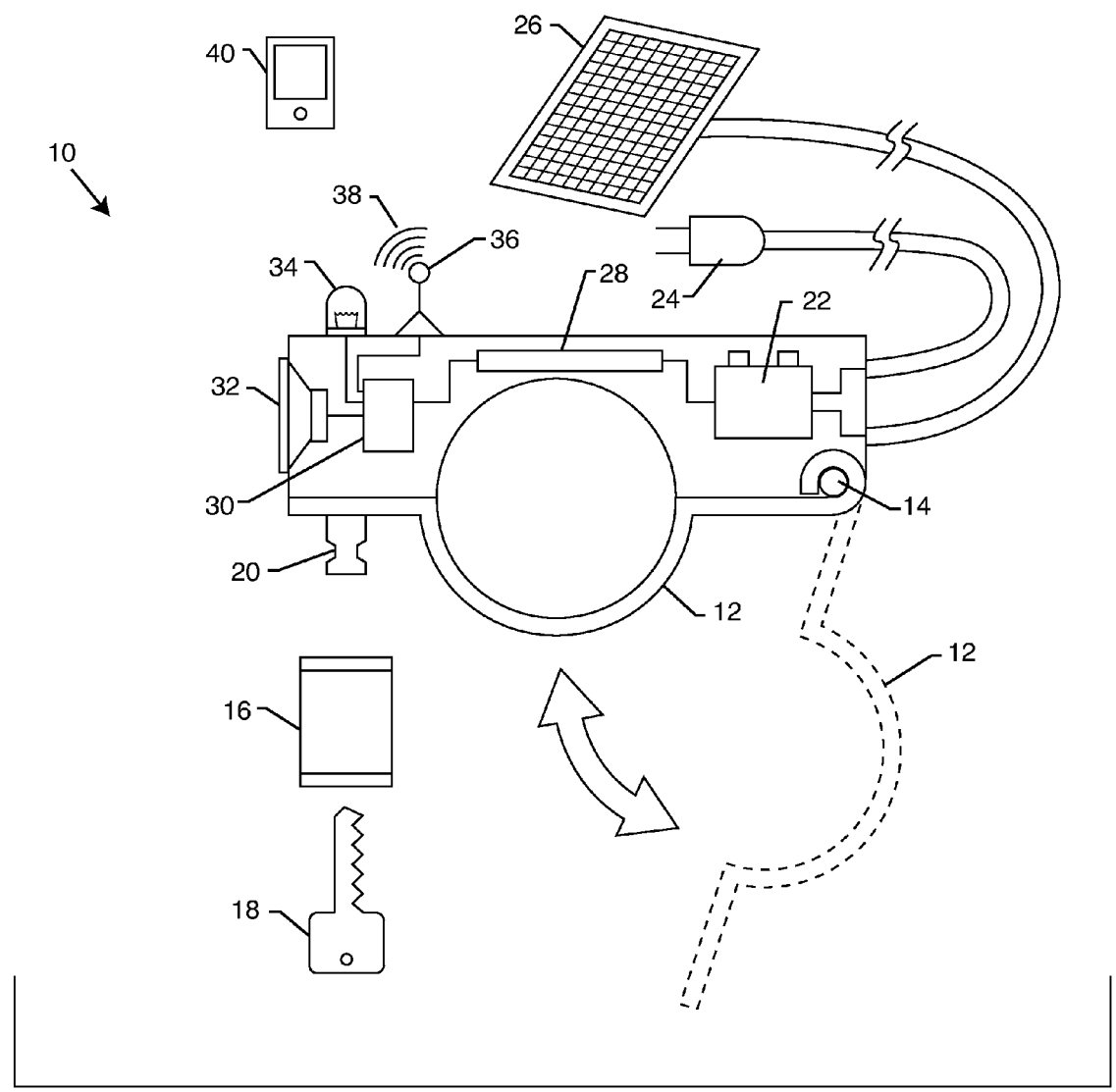

WATER SAVING ALERT SYSTEM

CROSS-REFERENCE TO RELATED APPLICATIONS

This application claims priority to provisional application 61/986,818 filed on Apr. 30, 2014, the entire contents of which are fully incorporated herein with this reference.

DESCRIPTION

Field of the Invention

The present invention generally relates to a device that will alert users that they are using (or wasting) more than a certain amount of water. More particularly, the present invention relates to a portable device clip that may be connected to any type of water pipe, will measure and time the flow of water, and will alert users via an audible alarm if and when water flows for more than a user-specified period of time. The invention may be used by both consumers and landlords to educate users in the prevention of undue water consumption, and to save thousands of gallons of water per year.

Background of the Invention

It is in the interests of individuals, institutions, and the public at large to use water efficiently. Efficient water use and low water consumption saves on water bills and minimizes the adverse impact to the environment. For example, currently, the State of California is facing the worst water shortage that it has suffered in, at least, the last one hundred (100) years. Moreover, households and businesses alike are consistently subject to increasing water bills and expenses.

Accordingly, there is a need for an educational and informative device that can alert consumers to wasteful water use, thereby preventing undue water consumption, and saving thousands of gallons of water per year. The present invention fulfills these needs and provides other related advantages.

SUMMARY OF THE INVENTION

The Water Saving Alert System of the present invention includes a portable device clip that may be connected to any type of water pipe. The portable device includes a fluid-flow detection system that users may set to sound an audible alarm if water flows for more than a user-specified period of time. From the moment that water begins to flow through the pipe, the fluid-flow detection device will engage a timer to run. If water continues to flow for more time than the user-set limit, the fluid-flow detection device will send a signal to an audible alarm that will sound until water ceases to flow. The alarm shall automatically reset itself only after the water ceases to flow for a few seconds.

Accordingly, by connecting the WATER SAVING ALERT SYSTEM of the present invention to any bathroom faucet pipe, toilet, shower, garden hose, device, or appliance that uses water, households, businesses, consumers, and landlords can educate themselves to correct the minimum timing to save the maximum amount of water per year, thereby preventing the undue consumption of water, and saving thousands of dollars per year.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a side view of one embodiment of the water saving alert system.

DETAILED DESCRIPTION OF THE PREFERRED EMBODIMENTS

The claimed invention comprises a combination of a universal clip, and water-flow detector, a timing mechanism, an alarm and related components. The invention allows users to attach the invention to their water pipes and plumbing fixtures in order to alert them to excessive or wasteful water consumption. In this matter, the device allows consumers to be trained in efficient use of water resources.

In one exceptional embodiment of the claimed invention, the clip comprises a spring-loaded retention device, which allows the device to be removably attached to water pipes and plumbing fixtures of various sizes. In this matter, the device may be used on one or more of the common water pipes and plumbing fixtures used in buildings. Also, the device can be relocated from one plumbing fixture to another in order to allow it to be used on more than one plumbing fixture in a home.

In an exceptional embodiment of the claimed invention, the clip may feature a locking feature in order that it can only be removed by user that have a certain key. In this embodiment, for example, a landlord could install the alarm to a tenant's fixtures in a manner that the tenant would be unable to remove the device without the landlord's authorization.

In another exceptional embodiment of the invention, the device may be configured to simultaneously attach to both the hot water and cold water pipes that are commonly found under plumbing devices such as sinks. This allows one device to be used for both cold and hot water.

The invention furthermore features a flow sensor in order to detect the flow of water. In one embodiment of the invention, the device detects flow by using a vibration detector, such as a piezo-electric transducer. The device may be configured to use one or more of the water flow detectors commonly used in the art. The device also may be configures to feature a sensitivity adjustment in order that the user may control the sensitivity of the device to vibrations/water-flow. This could be useful to change the function of the device to monitor for possible leaks by turning the sensitivity up to a high level.

The flow sensor feeds a signal to a timer, which times the start and stop of water flow. The timer features an adjustable setting such that the user may program the duration of time before the alarm sounds. In an exceptional embodiment of the invention, the device features preset settings for common plumbing fixtures such as bathroom sinks, toilets, kitchen sinks, showers, and other such fixtures.

The timer, in turn, sounds an alarm when excessive water flow is detected. The alarm may be an audio alarm, a visual alarm, or both. In this manner, users are altered when their water usage exceeds the pre-programmed guidelines.

In an exceptional embodiment of the invention, the device furthermore feeds data (via WiFi, Bluetooth, or other transmission means known in the art) to a computer, smart phone, or database.

The device furthermore features a power source. In an exceptional embodiment of the invention, the power source may be an electrical socket, a battery, a rechargeable battery, or a solar power supply.

In an exceptional embodiment of the invention, the device features a user interface in order to allow users to program the device. The user interface may, for example, comprise a digital screen that shows water consumption and programming data for the user. In another exceptional embodiment of the invention, the user interface may include a screen that can be placed next to a plumbing fixture in order to provide the user with real time data concerning water usage.

In an exceptional embodiment of the device, the device may be configured in order that a landlord may monitor the water consumption of one or more tenants and one or more plumbing fixtures. In such a configuration, multiple devices may be attached to multiple plumbing fixtures throughout a building. In addition to alerting tenants when their water usage is excessive, the devices can supply data to the landlord's computer, smart phone, or web-based application such that the landlord may monitor the various tenant's fixtures water usage.

FIG. 1 is a side view of one embodiment of the water saving alert system 10. A clip 12 has a pivotable connection 14 that allows the clip 12 to open and enclose a water pipe (not shown). The pivotable connection 14 can include a spring which helps hold the device 10 to the water pipe. The clip 12 has a lock 16 that can connect to the clip 12 at an extension 20. The lock 16 has a key 18 that opens the lock 16. The lock 16 when attached to the extension 20 prevents the clip 12 from opening and being removed. A power source 22 may be a battery, or alternatively be coupled to a plug 24 or even a solar cell 26. A water-flow detector 28 is integrated into the clip 12 and is configured to detect whether the water pipe has water flowing within. A timing mechanism 30 is coupled to the water-flow detector 28. An alarm is coupled to the timing mechanism 30. The alarm can be a speaker 32, a light 34 or a transmitter 36 that sends a wireless signal 38 to a computer or smart device 40. The smart device 40 can even double as a digital screen 40 that can be used to set up and control the device 10.

In practice, the clip is attached to a water pipe. The second water starts running through the pipe, the fluid-detection device starts the timer running. When the timer reaches the required pre-set limit, it will send a signal to the alarm and it will start beeping or flashing (or both) until the water is turned off. The system can then reset and be ready for use again. If the user tries to trick the system and restart the water within a second pre-set limit, the alarm will go off yet again. The user will have to shut off the water for enough of a time such that device does a complete reset.

Another use of the device is to prevent a stuck toilet or other water faucet device. For example, if one flushes the toilet and the shut off valve stays open, the toilet will waist 3 gallons per minute or 180 gallons per hour. By the time the user realizes the mistake it can be many hours and much water and money has already been wasted. With the device 10, within a minute an alarm will sound notifying the user that the water needs to shut off.

Another example of use is to monitor the brushing of a child's teeth. A child may turn the water on and leave it running while they brush their teeth. This wastes a lot of water. Or, a child may forget to turn off the water after they are done. The device 10 can alert the child or an adult that water is being wasted after, for example, 3 minutes of constant water usage. The device 10 is a great device to teach children proper water maintenance.

Another example of use is that a landlord or parent can monitor the shower usage of a tenant or child. For example, the timer can be set for 7 minutes such that a shower is limited to just 7 minutes. The annoyance of the device 10 prompts the user to finish their shower in a timelier manner.

In apartment units or commercial units that don't have separate water meters, it is impossible for a landlord to know which tenant is using water. A particular tenant might be wasteful or worse yet leave the water running on purpose to waste the landlord's money on water. The device 10 allows a landlord the ability to monitor the water usage of individual tenants and prevent such problems.

In another embodiment of the invention, additional features can be added. For example, the device can include a data base and record and keep the entirety of the usage history. This allows one to create a daily, weekly or monthly detail. A memory card can be added such that it records all the data. The landlord then simply removes the memory card and can download it at a later time or onto his computer. Furthermore, the device can include a digital lock such that outsiders cannot tamper with the preset time limits or erase the data.

The device can also come with a list of preset time limits. For example, a toilet can be set for 1 minute usage and a reset time limit of 20 seconds, a shower can be set for a 7 minute usage with a reset time limit of 30 second, and a faucet can be set for a 3 minute usage with a reset time limit of 20 seconds. Again, these presets can all be adjusted at the factory manufacturing the devices or by each individual user.

In another embodiment of the device, the audible alarm (or even the visual alarm) can be set with varying intensity levels. For instance, once the timer has reached its limit, a first sound may be activated. Then, if no action has been taken, after another preset time limit the sound level (visual intensity) can be increased to make it louder. As can be appreciated, a vary level of sound intensities can be used to help the user of the water usage to turn off the water. This also allows the user notification that the sound will keep getting louder and louder until the water (and sound) is turned off, which helps to persuade the user from turning off the water in a timely manner.

Although several embodiments have been described in detail for purposes of illustration, various modifications may be made to each without departing from the scope and spirit of the invention. Accordingly, the invention is not to be limited, except as by the appended claims.

What is claimed is:

1. A water saving alert system, comprising:
    a clip being capable of being removably attachable to a water pipe;
    a water-flow detector integrated into the clip, the water-flow detector being capable of detecting a water flow within the water pipe when the clip is attached to the water pipe;
    a power source coupled to and powering the water-flow detector;
    a lock openable by a key, the lock being attached to the clip for preventing unwanted removal of the water saving alert system from the water pipe;
    the clip comprising a body and a hook, the body comprising a connection and an extension opposite to each other, the hook being pivotally connected with the connection at one end and removably engaged with the extension at the other end, the lock being removably attachable to the extension;
    a timing mechanism coupled to the water-flow detector, the timing mechanism being capable of being set to monitor a preset amount of time and another preset amount of time successive to the preset amount of time;

an alarm coupled to the timing mechanism;

the alarm producing an audible sound and a visual light each having an initial intensity and a successive intensity stronger than the initial intensity, the audible sound and the visual light being activated with the initial intensity when the preset amount of time expires, the audible sound and the visual light being activated with the successive intensity when the another preset amount of time expires;

the power source comprising an electrical plug, the electrical plug being capable of being connectable to an electrical socket, a battery, a rechargeable battery or a solar power supply;

a digital screen coupled to the water-flow detector; and the clip being capable of being simultaneously and removably attachable to both a hot water pipe and a cold water pipe adjacent to each other.

2. The water saving alert system of claim 1, wherein the alarm comprises a speaker configured to produce the audible sound.

3. The water saving alert system of claim 1, wherein the alarm comprises a light emitting diode or light configured to produce the visual light.

4. The water saving alert system of claim 1, wherein the alarm comprises a wireless transmitter configured to send an alarm signal.

5. The water saving alert system of claim 4, wherein the wireless transmitter comprises a device using WiFi, Bluetooth or infrared radiation.

6. The water saving alert system of claim 4, wherein the alarm signal comprises a text, a page, a voicemail or an email.

7. The water saving alert system of claim 4, wherein the alarm signal is sent to a computer, a smart phone or to a database.

8. The water saving alert system of claim 1, wherein the water-flow detector comprises a vibration detector.

9. The water saving alert system of claim 1, wherein the water-flow detector comprises a piezo-electric transducer.

10. The water saving alert system of claim 1, wherein the water-flow detector comprises a sensitivity adjustment in order that a user may control the sensitivity.

* * * * *